Feb. 12, 1957
J. C. KREJCI
2,781,247
CARBON BLACK PROCESS
Filed Jan. 29, 1954
3 Sheets-Sheet 2
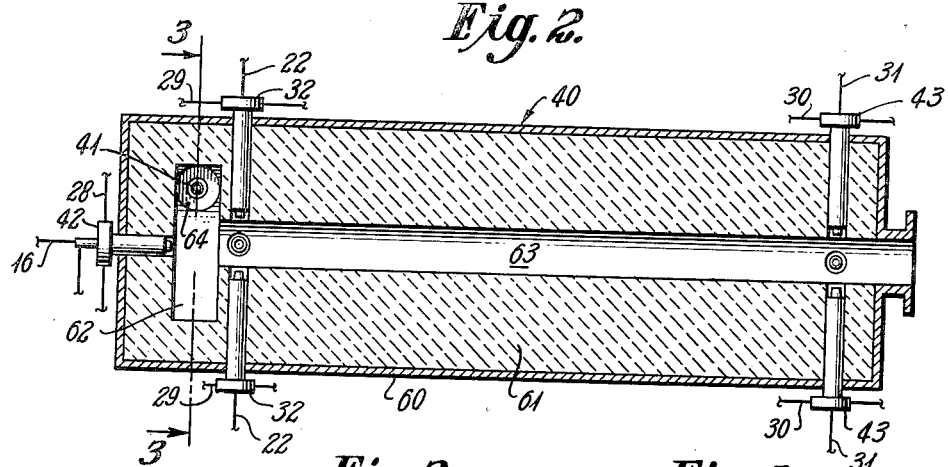
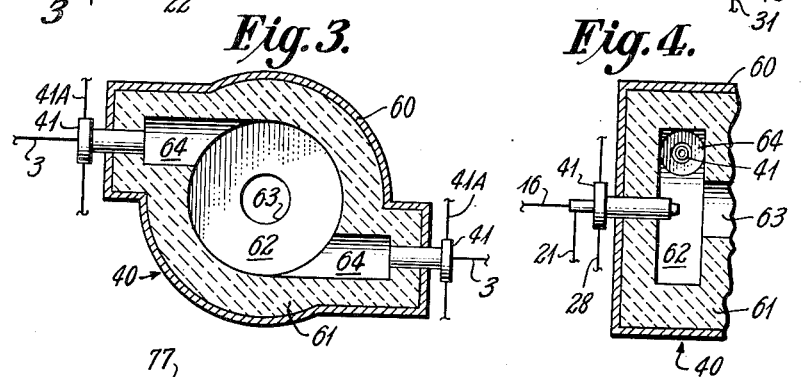
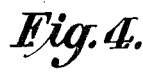
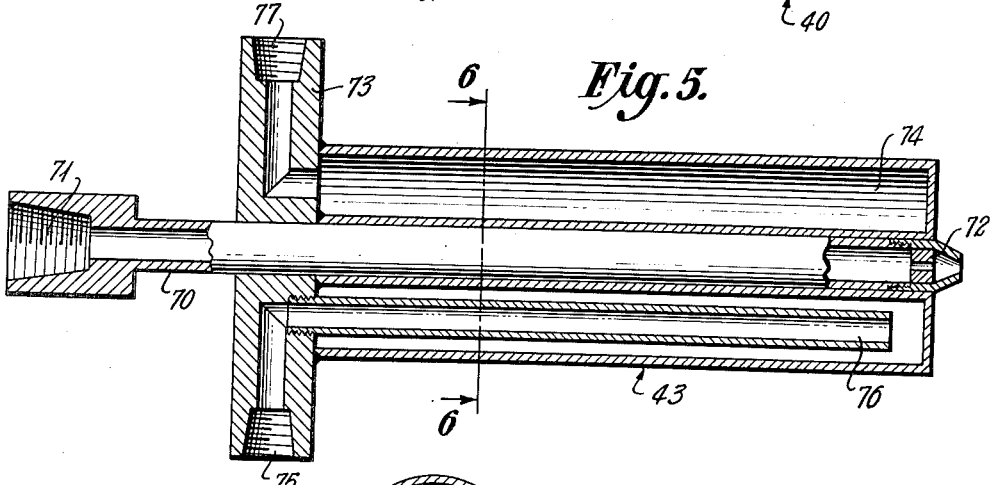
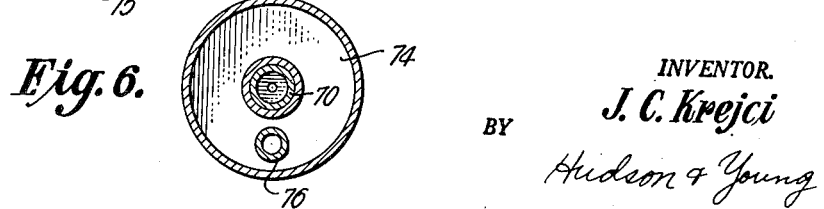
INVENTOR.
J. C. Krejci
BY Hudson & Young
ATTORNEYS

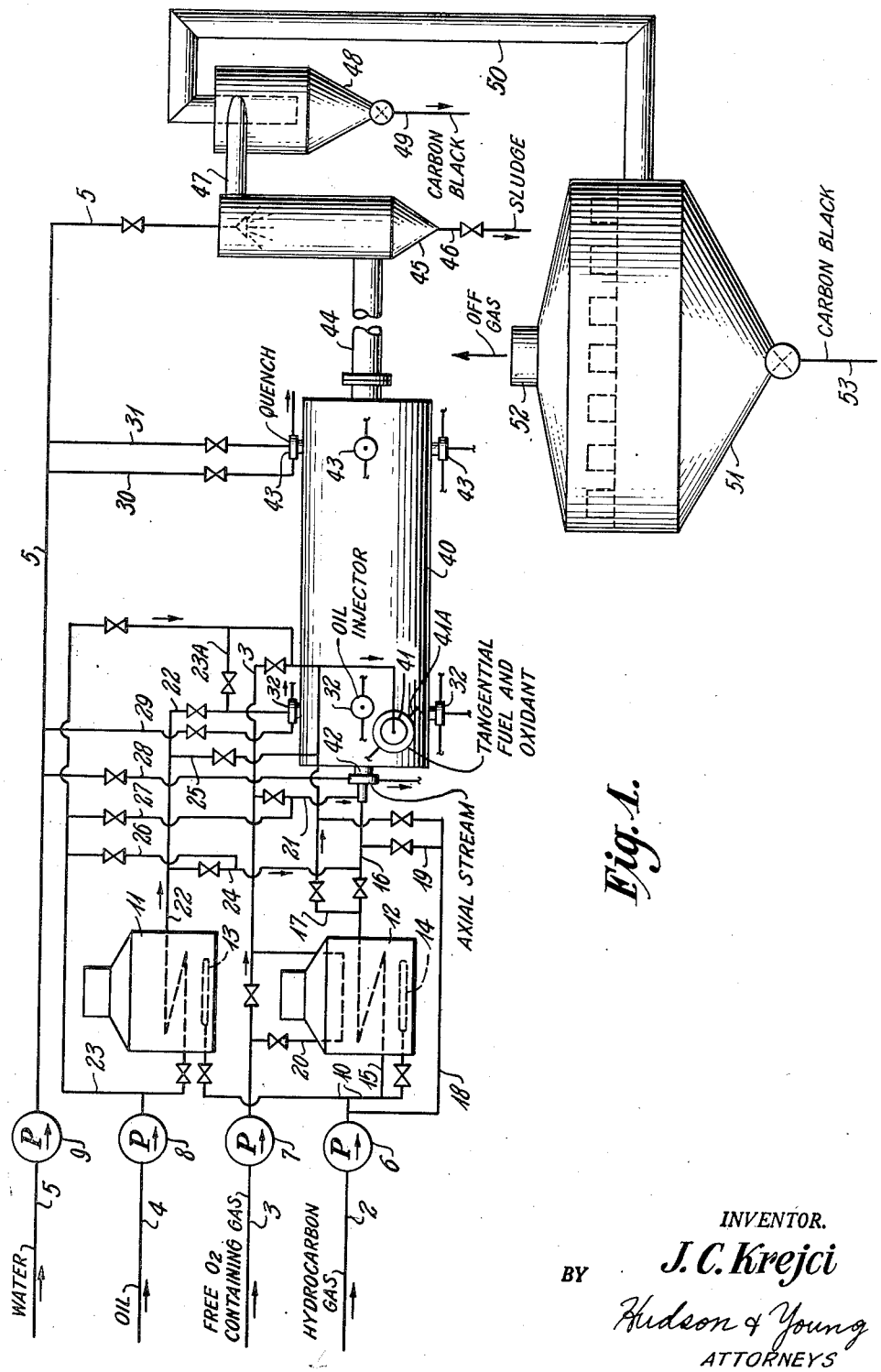

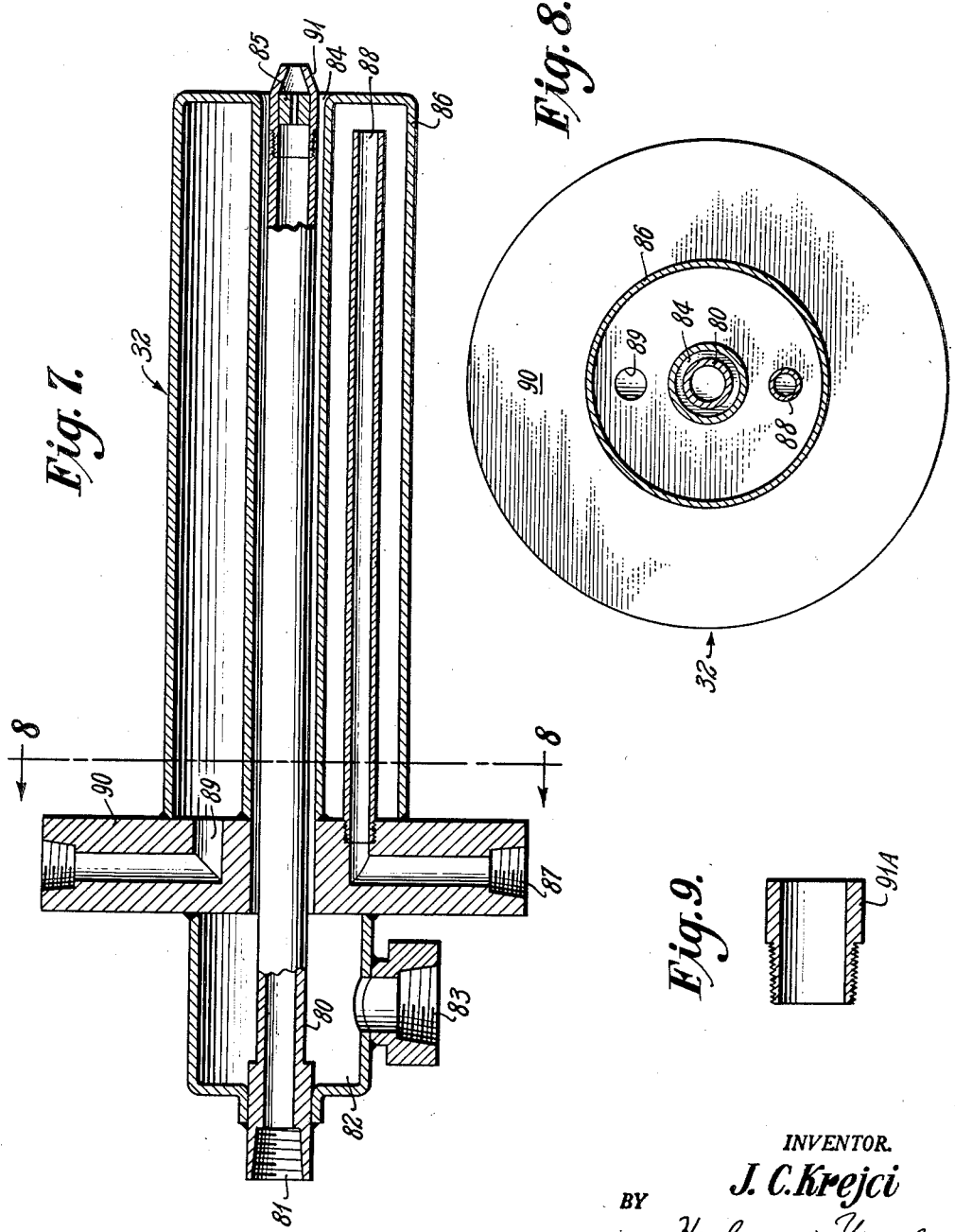

United States Patent Office 2,781,247
Patented Feb. 12, 1957

2,781,247
CARBON BLACK PROCESS

Joseph C. Krejci, Phillips, Tex., assignor to Phillips Petroleum Company, a corporation of Delaware Application January 29, 1954, Serial No. 406,921

9 Claims. (Cl. 23—209.4)

This invention relates to the production of carbon black by pyrolysis and/or partial combustion of carbonaceous material. In one aspect, it relates to a novel process for producing high-quality carbon black. In another aspect, it relates to a novel apparatus suitable for producing carbon black.

In U. S. Patent 2,564,700, J. C. Krejci, 1951, there is disclosed a process by which an excellent grade of carbon black is produced in an apparatus which includes a combustion chamber and a reaction chamber. The combustion chamber is of greater diameter than the reaction chamber. The two chambers are coaxial and in open communication with each other. The combustion chamber is provided with at least one tangential inlet through which a combustible mixture of fuel and oxidant are admitted to form a swirling body of hot combustion gas which travels in a generally helical path into, and adjacent the wall of, the reaction chamber, thus providing a zone maintained at a carbon black-forming temperature. A carbonaceous feed injected longitudinally into said zone reacts to form a high yield of excellent quality carbon black. The process is referred to as a tangential-flame process of the precombustion type.

The present invention produces a carbon black having certain special and desirable properties, such as fine particle size, high tint strength, and high surface area, and provides a novel apparatus for producing such a black.

According to one embodiment of this invention, an apparatus is provided which comprises a generally cylindrical combustion chamber positioned contiguously, coaxially, and in open communication with a generally cylindrical reaction chamber of smaller diameter than said combustion chamber, said combustion chamber having at least one tangentially positioned inlet means, and said reaction chamber having at least one inlet means positioned nonlongitudinally and in some cases nonaxially and nontangentially, with respect to said reaction chamber at a locus relatively near said combustion chamber.

According to one modification of the invention, the last-mentioned inlet means is positioned radially with respect to said reaction chamber.

According to a further modification of the invention, a plurality of such radial inlet means can be employed.

According to another embodiment of the invention, carbon black is produced by passing a combustible mixture of fuel and oxidant tangentially into a generally cylindrical combustion zone, substantially completely reacting said mixture by combustion near the periphery of said combustion zone, passing hot combustion gas, so produced, in a generally helical path into a contiguous, generally cylindrical reaction zone of smaller diameter than said combustion zone, nonlongitudinally, and, in many cases, nonaxially and nontangentially, injecting a reactant carbonaceous material into said reaction zone, reacting said carbonaceous material to form carbon black, and recovering said carbon black.

According to a modification of the invention, an additional stream of reactant material can be injected axially into said combustion zone and reacted to form carbon black in said reaction zone.

Embodiments of the invention are illustrated in the drawings.

Figure 1 is a schematic flow diagram of a process according to this invention.

Figure 2 is an elevational diagram of an apparatus according to this invention.

Figure 3 is an end view taken along line 3—3 of Figure 2.

Figure 4 is an elevational diagram of an apparatus of the type shown in Figure 2 but provided with an axial injector projecting into the combustion chamber.

Figure 5 is an elevational diagram of an injector means according to this invention.

Figure 6 is an end view taken along line 6—6 in Figure 5.

Figure 7 is an elevational diagram of another injector means according to this invention.

Figure 8 is an end view taken along line 8—8 of Figure 7.

Figure 9 is an elevational diagram of an alternative outlet member used in connection with the apparatus of Figure 5 or of Figure 7.

As shown in Figure 1, hydrocarbon gas enters the system through inlet 2 and compressor 6, air or other oxygen-containing gas through inlet 3 and compressor 7, oil through inlet 4 and pump 8, and water through inlet 5 and pump 9.

The hydrocarbon gas can be any suitable fuel gas such as methane, ethane, natural gas, or residue gas. Alternatively, other fuels such as producer gas, carbon monoxide, hydrogen, liquid fuel oil, or powdered solid fuel can be used.

The oxygen-containing gas can be air, oxygen, or oxygen-enriched air.

The oil is preferably a higher aromatic or cyclic oil, such as a recycle gas oil from a catalytic and/or thermal cracking process. Alternatively, it can be a paraffinic, naphthenic, or unsaturated liquid hydrocarbon, such as naphtha or kerosene or gas oil; or it can be a normally gaseous hydrocarbon such as methane, propylene, or acetylene.

The hydrocarbon gas can flow through conduits 18, 17, and 3 to tangential inlet 41 in reactor 40. Part of the gas can pass through line 10 to burner 14 in preheater 12 as fuel. Part or all of the gas can be passed through lines 15, 17, and 3 being preheated to any desired temperature in preheater 12.

Oxygen-containing gas passes through conduit 3 to tangential inlet 41 in reactor 40. Part or all of the oxygen-containing gas can be passed through line 20 and preheated to any desired temperature in preheater 12. Part of the oxygen-containing gas can be passed through line 21 to axial inlet 42, as subsequently described.

Oil can pass through lines 23, 26, 24, and 16 to axial inlet 42. Part or all of the oil feed can be preheated or vaporized by passage through line 22 and preheater 11, provided with burner 13, which is supplied with fuel gas through lines 2 and 10. According to this invention, at least part, and in some cases, all of the oil passes through pipe 22 to radial inlets 32, with or without preheating (lines 23 and 23A when no preheating is used).

Water passes through inlet 5 to quenches 43 and/or 45. Part of the water can be supplied as coolant to inlet 42 and/or inlets 32 through pipes 28 and/or 29, as subsequently described.

The mixture supplied to tangential inlet 41 is a combustible mixture of fuel and oxidant, which can be present in stoichiometric proportions. Alternatively, the mixture can be rich or lean in fuel. The fuel is ordinarily gas supplied through pipes 3, and 17, but can consist entirely or partially of vaporous or liquid oil supplied through conduits 23 and 3 and/or through conduits 22, 25, 17, and 3.

Ordinarily, the feed to radial inlets 32 is oil and that to tangential inlet 41 is fuel gas and air.

Combustion of the combustible mixture produces a helically moving blanket of hot combustion gas passing through reactor 40, as subsequently described.

Reactant oil, injected through radial inlets 32 into the blanket of combustion gas, reacts in reactor 40 to form carbon black.

If desired, part of the reactant can be axially injected into reactor 40 through inlet 42. The axially injected reactant can consist solely of oil supplied through conduits 16 and 24; solely of gas supplied through conduit 16 from conduit 15 and/or 18 and 19; or it can comprise both gas, supplied, as described, through conduit 16, and oil, supplied through conduits 23, 27, and 21, as subsequently described. The oil can be liquid or vaporized, and the gas can be preheated.

The reaction mixture is quenched by water directly injected into said mixture through conduits 5 and 31 and inlets 43, and the reaction is thus stopped. The internal quench, broadly, is disclosed and claimed in my copending application, Serial No. 406,695, filed January 28, 1954. Further cooling is obtained in pipe 44, which can be uninsulated and exposed to the atmosphere to provide atmospheric cooling or can be partially or totally enclosed by a cooling-water jacket, not shown.

The partially cooled reaction mixture, comprising carbon black suspended in combustion gas, passes to secondary quench zone 45, where it is further cooled by water directly injected from line 5. Any sludge-like material is withdrawn through outlet 46.

The cooled reaction mixture passes through pipe 47 to separator 48, from which separated carbon black is withdrawn as product through outlet 49. Gas, containing unseparated carbon black passes to separator 51 through pipe 50. The remaining carbon black is recovered in separator 51 and withdrawn as product through outlet 53. Off-gas is withdrawn through outlet 52.

Separators 48 and 51 can be any known gas-solids separating means, such as cyclone separators, Cottrell precipitators, bag filters, or any suitable combinations thereof.

Figures 2 and 3 illustrate a reactor according to this invention. The reactor is generally designated as 40. It comprises an outer metallic shell 60 and refractory insulation and lining, generally designated as 61, which can include layers of two or more different refractory or insulating materials. The lining is so shaped as to form combustion chamber 62 and reaction chamber 63. Combustion chamber 62 preferably has a diameter greater than its length. Reaction chamber 63 is of smaller diameter than combustion chamber 62. Combustion chamber 62 is provided with tangential tunnels 64, which may be of any desired number, two being shown in Figure 3. Inlets or burners 41 are positioned in tunnels 64 and are designed to admit a combustible mixture of fuel and oxidant, as previously described. Burners 41 can be provided with cooling jackets supplied with cooling water through pipes 41A. Reactor 40 is also provided with radially positioned inlets 32. Although four radial inlets, spaced 90 degrees apart around the circumference of reactor 40 are shown in Figure 2, any number including one, can be used. Two such inlets spaced 180 degrees apart have been used with satisfactory results. The radial inlets can be provided with cooling jackets supplied with cooling water through inlet 29, which is suitably manifolded when more than one radial inlet is used. The radial inlets are preferably positioned near the inlet end of reaction chamber 63, and, in any event, are positioned, at a distance from chamber 62, not more than half, preferably not more than one-fourth, of the distance from chamber 62 to quench inlets 43. Axial inlet 42 can also be positioned in the end wall of chamber 62 and can be provided with a water jacket to which cooling water is supplied through pipe 28. Quench inlets 43 are positioned at a locus in the downstream end of reaction chamber 63. Although four such inlets, spaced 90 degrees apart, are shown, any suitable number, preferably at least 2, can be used, as set forth in my copending application previously cited.

In operation, the combustible fuel-oxidant mixture enters reactor 40 through one or more tangential inlets 41 and is completely combusted near the periphery of combustion chamber 62. Ordinarily the combustion is substantially completed within tunnels 64. A resulting combustion gas mixture travels in a substantially helical path along the wall of reaction chamber 63, maintaining chamber 63 at a carbon black-forming temperature, usually in the range 2000 to 3500° F. Reactant hydrocarbon is injected radially through inlets 32 and reacts to form carbon black in chamber 63 by virtue of heat directly imparted from the hot combustion gas. A resulting mixture of carbon black and gas is quenched with water injected through quench inlets 43. Carbon black is recovered, after further cooling, as described in connection with Figure 1. It is often desirable to inject additional reactant axially through inlet 42. The amount of reactant so injected is preferably from about 30 to about 75 percent of the total reactant. Ordinarily the radially injected reactant is substantially equally distributed among the radial inlets when a plurality thereof is used. However, it will be understood that proportions other than those stated can be used within the scope of the invention.

Figure 4 illustrates the use of another type of axial injector 41 with reactor 40. This injector is subsequently described in detail. It allows the injection of gas and/or oxidant along with axially supplied reactant oil, oil being supplied through conduit 16, gas and/or air through conduit 21, and cooling water through conduit 28. Air when so used prevents carbon formation at the outlet of the injector and facilitates vaporization of any liquid oil present. When gas and air are both supplied to the reactor, the gas also facilitates vaporization of any liquid oil. The cooling water prolongs the useful life of the injector by retarding oxidation thereof. Furthermore, injector 41 can project into the interior of combustion chamber 62.

Figures 5 and 6 illustrate a water jacketed injector 43. This type of injector is ordinarily used to inject quench water at 43. However, it can also be used as injector 32, 41, or 42, all of which are subjected to high temperatures. The injector comprises central tube 70, for oil, or water, water (or other coolant) jacket 74, block 73, and coolant induction tube 76. Tube 70 is provided with threaded inlet 71 and spray nozzle 72, of any desired type. Water jacket 74 is provided with threaded inlet 75 in block 73, and threaded outlet 77, also in block 73. The inlet 75 and the outlet 77 can be drilled in block 73 and subsequently threaded as indicated in Figures 5 and 6. Induction tube 76 is attached to block 73 by suitable thread arrangement and permits the continuous circulation of water or other coolant through jacket 74, thus protecting the unit from the high temperatures to which it is subjected. Water jacket 74 can be welded or otherwise attached to block 73, as indicated.

Another type of injector, according to this invention, is indicated as 32 in Figures 7 and 8. The injector comprises central tube 80, provided with threaded inlet 81, tip 91, and spray nozzle 85; water jacket 86; and block 90, provided with threaded inlet 87 and threaded outlet 89. Induction tube 88 is provided as described in connection with Figures 5 and 6. The members just enumerated are similar in structure and assembly to the corresponding members in Figures 5 and 6. Injector 32, however, is also provided with threaded inlet 83 and chamber 82, and water jacket 86 is separated from tube 80 by annular space 84. Although welded construction is shown in Figure 7, any other suitable method of assembly, such as the use of flanges and bolts, can be used.

In operation, cooling water or other coolant is circulated through jacket 86, as already described. Oil is injected through tube 80 and nozzle 85. Air is injected through inlet 83, chamber 82, and annulus 84, preventing carbon deposition around tip 91 and aiding in the atomization of the oil. Alternatively, gas or a mixture of gas and air can be supplied through inlet 83, the gas acting as a reactant (when the gas is carbonaceous) and aiding in atomization of the oil.

Figure 9 illustrates tip 91A, which can be substituted for tip 91 when the reactant supplied through tube 80 is predominantly in a gaseous phase, e. g. when the oil is vaporized prior to passing into reactor 40 (Figure 1). When all reactants are injected in the gas or vapor phase reactant can be introduced either through tube 80 or inlet 83, or both. Tip 91A can also be used in place of nozzle 72 in the apparatus of Figures 5 and 6.

EXAMPLE I

A process according to this invention was conducted, utilizing a reactor similar to that shown in Figure 2, but without quench inlets 43. Quenching was effected by injecting water directly into the reaction mixture at a point downstream from the reactor. Also, only two radial reactant inlets were provided. These were positioned 180 degrees apart and 3 inches downstream from the inlet to the reaction chamber, which was 12 inches in diameter and 11 feet in length. The combustion chamber was 12 inches in length and 37 inches in diameter. It was provided with two tangential tunnels 10 inches in diameter and 180 degrees apart, each provided with a burner. A combustible mixture of fuel gas (predominantly methane) and air was supplied to the tangentially positioned inlets and reacted by combustion in the burners. An aromatic recycle gas oil was injected, as reactant, through the radial inlets, each of which was provided with an injector of the type shown in Figures 5 and 6. The carbon black formed by reaction of the gas oil was recovered and tested. This run is designated run "A." No axial feed was utilized in this run. The radially injected feed oil was unvaporized and was not preheated.

In a comparative run, designated run "B," the same gas oil was converted to carbon black in a reactor similar to that used in run A, but no radial injection of feed was used, all of the feed oil being axially injected through an injector of the type shown in Figures 7 and 8, air being injected through the annulus provided for that purpose. This air is termed "jacket air." The operating data are shown in Table I.

Table I.—Operating Data

| Run | Oil rate | | | Tangential | | Jacket air rate, C. F. H. | Reactor temp., °F. | Pho-telom-eter [4] | Gas analysis, percent by volume | | | | | | Esti-mated pilot plant yield, lb./gal. | Grit | | Tint [5] | Surface area, [6] sq.m./gm. |
|---|---|---|---|---|---|---|---|---|---|---|---|---|---|---|---|---|---|---|---|
| | Ra-dial [1] | Axial, gal./hr. | Total | Air rate, C. F. H. | Gas rate, C. F. H. | | | | $CO_2$ | $C_2H_2$ | $H_2$ | CO | $CH_4$ | $N_2$ | | 80 [2] mesh, per-cent | 325 [3] mesh, per-cent | | |
| A | 151 | -------- | 151 | 125,000 | 8,330 | None | 2,530 | 88 | 5.73 | 1.0 | 12.22 | 11.34 | 0.77 | 68.94 | 2.56 | -------- | .043 | 184 | 90.6 |
| B | -------- | 166 | 166 | 125,000 | 8,330 | 4,000 | 2,580 | 93 | 5.82 | 0.87 | 11.46 | 11.35 | 0.67 | 69.83 | 2.92 | .003 | .013 | 182 | 86.2 |

[1] Radial ports were located at the extremes of a vertical diameter 3 inches downstream of the inlet to the 12-inch section. Radial oil was divided equally between the two ports.
[2] Carbonaceous grit from the cooling pipe sample.
[3] Total grit from bag filter sample.
[4] Measure of tar content. Value of 100 signifies black is tar-free. Values above 85 are satisfactory.
[5] Determined by mixing black with ZnO and determining amount necessary to produce same color as a standard black which is assigned a value of 100.
[6] Determined by nitrogen adsorption.

In run A, carbon was deposited near the inlet of the reaction section. However, the amount was insufficient to impair operability. Carbon deposition can be prevented by vaporizing the feed oil prior to its entry into the reactor, as previously described.

The gas oil used as reactant in runs A and B had the following properties:

Distillation, ASTM,
  Temp. °F. at 760 mm.:
    0% distilled _____ 371
    5 _____ 454
    10 _____ 468
    20 _____ 488
    30 _____ 497
    40 _____ 506
    50 _____ 518
    60 _____ 532
    70 _____ 550
    80 _____ 577
    90 _____ 628
    95 _____ 654
    E. P. _____ 656
Gravity, °API _____ 21.8
Aniline point, °F _____ 19.6
Pour point, °F _____ —
Viscosity:
    SUV 100 F., sec _____ 36.9
    SUV 210 F., sec _____ 30.1
Carbon residue, ramsbottom, percent ____ 0.18
Correlation Index, Bur. of Mines _____ 69.9

The carbon blacks produced in runs A and B were compounded with GR–S synthetic rubber (butadiene-styrene copolymer) according to the following recipe:

GR–S _____ 100.0
Black _____ 40.0
Zinc Oxide _____ 3.0
BRT #7 [1] _____ 6.0
Sulfur _____ 1.75
Sanctocure [2] _____ 0.8

[1] Softener. Refined tar having high free C content.
[2] Trade name. Accelerator. N-cyclohexyl-2-benzothiazole-sulfenamide.

The following test data on the compounded rubber samples were obtained from the blacks obtained from runs A and B and a commercial carbon black (run C) obtained by axial injection in a manner similar to that in run B.

Table II.—Rubber properties (30 min. cures at 307° F.)

| Carbon black from run | 80° F. | | | 200° F.[1] maximum tensile, p.s.i. | ΔT, °F. | Resilience, percent | Flex life, M | Shore hardness | Abrasion loss,[2] grams | Abrasion index | Compression set, percent | Compounded MS 1½ | Extrusion at 250° F. | | |
|---|---|---|---|---|---|---|---|---|---|---|---|---|---|---|---|
| | 300% Modulus, p.s.i. | Tensile, p.s.i. | Elongation, percent | | | | | | | | | | In./min. | G./min. | Rating |
| A | 1,520 | 3,670 | 570 | 1,420 | 62.8 | 60.1 | 8.6 | 59 | 9.31 | 107 | 16.4 | 35.5 | 31.5 | 90 | 11 |
| B | 1,400 | 3,620 | 575 | 1,500 | 59.1 | 62.9 | 9.6 | 59 | 8.77 | 113 | 16.2 | 33.5 | 29.5 | 87 | 11 |
| C | 1,260 | 3,340 | 575 | 1,520 | 60.2 | 62.6 | 12.1 | 58 | 9.94 | 100 | 15.9 | 35.5 | 31.3 | 94.5 | 11− |

OVEN AGED 24 HOURS AT 212° F.

| A | 2,250 | 3,540 | 430 | | 55.1 | 65.4 | 3.7 | 65 | 7.32 | 111 | | | | | |
| B | 2,330 | 3,020 | 380 | | 53.4 | 66.0 | 6.3 | 65 | 7.12 | 114 | | | | | |
| C | 2,190 | 3,190 | 410 | | 52.1 | 67.3 | 3.9 | 63 | 8.13 | 100 | | | | | |

[1] 45 minute cures.
[2] 35 minute cures.

The foregoing data show that the carbon black produced according to this invention (run A) has a higher surface area than that produced in run B. This indicates that the black produced according to this invention has smaller particle size than that from run B. The higher heat build-up (ΔT), the higher Mooney viscosity, and the lower resilience of the black produced according to this invention indicate that this black is significantly more reinforcing than the blacks from runs B and C.

EXAMPLE II

Two runs, designated "D" and "E" were conducted according to this invention, utilizing the reactor described in Example I. In these runs, the feed oil used in Example I was fed into the reactor both through the axial inlet and through the two radial inlets simultaneously. The tangential feed was the same as that used in Example I. The operating data are shown in Table III.

In run E the axial inlet tube or injector projected 8 inches into the combustion chamber in the manner indicated in Figure 4. The carbon black produced in this run had a high tint strength and a high surface area, indicating very fine particle size. Comparison of runs D and E shows that properties of carbon black produced according to this invention can be appreciably varied, within a satisfactory range of values, to obtain carbon blacks having desired properties. Carbon deposition in the reactor during runs D and E can be eliminated by prevaporization of the feed oil.

Carbon black from runs D and E were compounded with GR–S synthetic rubber as described in Example I and the resulting rubber samples were tested. The results are shown in Table IV, along with the corresponding data from runs B and C of Example I.

Table III.—Operating Data

| Run | Oil rate | | | Tangential | | Jacket air rate, C. F. H. | Reactor temp., °F. | Photometer | Gas analysis, percent by volume | | | | | | Estimated pilot plant yield, lb./gal. | Grit | | Tint | Surface area, sq.m./gm. |
|---|---|---|---|---|---|---|---|---|---|---|---|---|---|---|---|---|---|---|---|
| | Radial[1] | Axial, gal./hr. | Total | Air rate, C. F. H. | Gas rate, C. F. H. | | | | $CO_2$ | $C_2H_2$ | $H_2$ | CO | $CH_4$ | $N_2$ | | 80[2] mesh, percent | 325[3] mesh, percent | | |
| D | 90 | 78 | 168 | 125,000 | 8,330 | 4,000 | 2,520 | 88 | 5.75 | 0.92 | 11.76 | 11.22 | 0.72 | 69.63 | 2.97 | .078 | .066 | 173 | 80.3 |
| E | 87.6 | 61 | 149.6 | 125,000 | 8,330 | 4,000 | 2,580 | 93 | 5.92 | 0.89 | 11.66 | 11.21 | 0.73 | 69.59 | 2.58 | | .062 | 199 | 92.8 |
| B | | 166 | 166 | 125,000 | 8,330 | 4,000 | 2,580 | 93 | 5.82 | 0.87 | 11.46 | 11.35 | 0.67 | 69.83 | 2.92 | .003 | .013 | 182 | 86.2 |

[1] Radial ports were located at the extremes of a vertical diameter 3 inches downstream of the inlet to the 12-inch section. Radial oil was divided equally between the 2 ports.
[2] Carbonaceous grit from the cooling pipe sample.
[3] Total grit from bag filter sample.

In the above table, the data from run B (Example I) are repeated for comparison.

Table IV.—Summary of rubber properties (30 min. cures at 307° F.)

| Carbon black from run | 80° F. | | | 200° F.[1] maximum tensile, p.s.i. | ΔT, °F. | Resilience, percent | Flex life, M | Shore hardness | Abrasion loss,[2] grams | Abrasion index | Compression set, percent | Compounded MS 1½ | Extrusion at 250° F. | | |
|---|---|---|---|---|---|---|---|---|---|---|---|---|---|---|---|
| | 300% Modulus, p.s.i. | Tensile, p.s.i. | Elongation, percent | | | | | | | | | | In./min. | G./min. | Rating |
| D | 1,480 | 3,320 | 535 | 1,350 | 58.1 | 63.5 | 14.0 | 59 | 9.25 | 108 | 15.6 | 34.5 | 30.5 | 89.8 | 11− |
| E | 1,430 | 3,520 | 545 | 1,350 | 61.9 | 60.6 | 8.5 | 60 | 9.22 | 108 | 16.4 | 35.5 | 30.8 | 90 | 11− |
| B | 1,400 | 3,620 | 575 | 1,500 | 59.1 | 62.9 | 9.6 | 59 | 8.77 | 113 | 16.2 | 33.5 | 29.5 | 87 | 11 |
| C | 1,260 | 3,340 | 575 | 1,520 | 60.2 | 62.6 | 12.1 | 58 | 9.94 | 100 | 15.9 | 35.5 | 31.3 | 94.5 | 11− |

OVEN AGED 24 HOURS AT 212° F.

| D | 2,240 | 2,790 | 350 | | 53.7 | 67.1 | 7.2 | 64 | 7.60 | 107 | | | | | |
| E | 2,250 | 3,370 | 410 | | 57.5 | 64.5 | 3.7 | 65 | 7.26 | 112 | | | | | |
| B | 2,330 | 3,020 | 380 | | 53.4 | 66.0 | 6.3 | 65 | 7.12 | 114 | | | | | |
| C | 2,190 | 3,190 | 410 | | 52.1 | 67.3 | 3.9 | 63 | 8.13 | 100 | | | | | |

[1] 45 minute cures.
[2] 35 minute cures.

The foregoing data show satisfactory rubber reinforcing properties in the black from runs D and E.

While certain structures, process steps, and example have been described for purposes of illustration, the invention is clearly not limited thereto. Variation and modification are possible within the scope of the disclosure and claims. The essence of the invention lies in the nonlongitudinal introduction of a reactant into a reaction zone in a tangential-flame carbon black process of the precombustion type and in an apparatus for such introduction. Thus the nonlongitudinally introduced feed can be introduced nonradially, e. g. at an angle to the radius of the reaction chamber and inclined either upstream or downstream; or tangentially in the same or opposite direction as the combustible fuel mixture. However, radial introduction is often preferred.

I claim:

1. In a process of the tangential flame, precombustion type in which a stream of carbonaceous reactant is converted to carbon black by longitudinal introduction into a preformed, helically traveling body of hot combustion gas, the improvement which comprises introducing at least one additional stream of reactant into said body of combustion gas in a direction transverse to the axial direction of flow of said combustion gas and at a locus downstream from the locus of formation of said combustion gas.

2. A process which comprises introducing a combustible mixture of a fuel gas and an oxidizing gas substantially tangentially into a generally cylindrical combustion zone having a diameter greater than its length; introducing a reactant hydrocarbon axially into said combustion zone; effecting substantially complete combustion of said mixture prior to contact of combustion gas produced thereby with said reactant hydrocarbon; passing said hydrocarbon, surrounded by a helically moving blanket of hot combustion gas, into a reaction zone which is contiguous and coaxial with, in open communication with, and of smaller diameter than said combustion zone; introducing radially into said reaction zone a plurality of streams of reactant hydrocarbon; heating reactant hydrocarbon to a carbon black-forming temperature in said reaction zone by heat imparted directly from said combustion gas; reacting reactant hydrocarbon to form carbon black; quenching a resulting mixture of carbon black and gas to a temperature at which no more carbon black is formed; and recovering carbon black as a product.

3. A process according to claim 2 wherein said plurality of streams of reactant hydrocarbon is four such streams spaced 90 degrees apart around a circumference of said reaction zone.

4. A process according to claim 2 wherein said quenching is effected by injecting at least one stream of water radially into said reaction zone at a locus therein downstream from the locus of radial introduction of reactant hydrocarbon.

5. A process according to claim 2 wherein said plurality of streams of reactant hydrocarbon is introduced into said reaction chamber at a locus near the inlet end thereof.

6. A process according to claim 2 wherein said plurality of streams is two such streams spaced 180 degrees apart around a circumference of said reaction zone.

7. A process which comprises introducing a combustible mixture of a fuel gas and an oxygen-containing gas substantially tangentially into a generally cylindrical combustion zone having a diameter greater than its length; introducing a hydrocarbon oil axially into said combustion zone at a locus intermediate the ends of said zone; effecting substantially complete combustion of said mixture prior to contact of resulting combustion gas with said hydrocarbon oil; passing said hydrocarbon oil, surrounded by a helically moving blanket of combustion gas, into a cylindrical reaction zone which is contiguous and coaxial with, in open communication with, and of smaller diameter than said combustion zone; introducing a plurality of additional streams of said hydrocarbon oil radially into said reaction zone at a locus adjacent the inlet end thereof; heating hydrocarbon oil, thus introduced, to a carbon black forming temperature in said reaction zone by heat imparted directly from said combustion gas; reacting the hydrocarbon oil to form carbon black; quenching a resulting mixture of carbon black and gas by the introduction of liquid water into said mixture at a point substantially downstream from the loci of oil introduction; and recovering carbon black as a product.

8. A process which comprises introducing a combustible mixture of a fuel gas and an oxidizing gas substantially tangentially into a generally cylindrical combustion zone; introducing a reactant hydrocarbon axially into said combustion zone; effecting combustion of said mixture adjacent the periphery of said combustion zone; passing said hydrocarbon, surrounded by a helically moving blanket of hot combustion gas, into a reaction zone which is contiguous and coaxial with, in open communication with, and of smaller diameter than said combustion zone; introducing at least one stream of reactant hydrocarbon into said reaction zone in a direction transverse to the axis thereof; heating reactant hydrocarbon to a carbon black forming temperature in said reaction zone by heat imparted directly from said combustion gas; reacting reactant hydrocarbon to form carbon black; and recovering carbon black as a product.

9. A process which comprises introducing a combustible mixture of a fuel gas and an oxidizing gas substantially tangentially into a generally cylindrical combustion zone; introducing a reactant hydrocarbon axially into said combustion zone; effecting combustion of said mixture adjacent the periphery of said combustion zone; passing said hydrocarbon, surrounded by a helically moving blanket of hot combustion gas, into a reaction zone which is contiguous and coaxial with, in open communication with, and of smaller diameter than said combustion zone; introducing radially into said reaction zone at least one stream of reactant hydrocarbon; heating reactant hydrocarbon to a carbon black forming temperature in said reaction zone by heat imparted directly from said combustion gas; reacting reactant hydrocarbon to form carbon black; and recovering carbon black as a product.

References Cited in the file of this patent

UNITED STATES PATENTS

| Number | Name | Date |
| --- | --- | --- |
| 1,438,032 | Frost | Dec. 5, 1922 |
| 2,121,463 | Wisdom | June 21, 1938 |
| 2,163,630 | Reed | June 27, 1939 |
| 2,599,981 | Eckholm | June 10, 1952 |
| 2,632,713 | Krejci | Mar. 24, 1953 |
| 2,659,662 | Heller | Nov. 17, 1953 |
| 2,682,450 | Sweigart | June 29, 1954 |